United States Patent [19]
How

[11] Patent Number: 5,396,518
[45] Date of Patent: Mar. 7, 1995

[54] APPARATUS AND METHOD FOR COMMUNICATING DIGITAL DATA USING TRELLIS CODING WITH PUNCTURED CONVOLUTIONAL CODES

[75] Inventor: Stephen K. How, San Diego, Calif.

[73] Assignee: GI Corporation, Hatboro, Pa.

[21] Appl. No.: 54,642

[22] Filed: May 5, 1993

[51] Int. Cl.$^6$ .............. H04L 5/12; H03M 13/12
[52] U.S. Cl. ..................... 375/265; 371/43; 375/244; 375/316
[58] Field of Search ............... 375/17, 26–28, 375/38–39, 42, 75, 94; 371/43; 329/300, 304; 332/100, 103

[56] References Cited

U.S. PATENT DOCUMENTS

| | | | |
|---|---|---|---|
| 4,483,012 | 11/1984 | Wei | 375/27 |
| 4,586,182 | 4/1986 | Gallager | 371/43 |
| 4,660,214 | 4/1987 | Pahlavan et al. | 375/39 |
| 4,901,331 | 2/1990 | Calderbank et al. | 375/39 |
| 5,054,036 | 10/1991 | Brownlie et al. | 375/27 |
| 5,115,453 | 5/1992 | Calderbank et al. | 375/39 |
| 5,195,107 | 3/1993 | Wei | 375/94 |
| 5,233,629 | 8/1993 | Paik et al. | 375/39 |
| 5,258,987 | 11/1993 | Wei | 371/43 |

OTHER PUBLICATIONS

W. Wang, et al., "VLSI Implementation of a 16-State Coset Code," *Integration, the VLSI Journal* 9, No. 3, Jul., 1990, pp. 303–319.

M. Kavehrad, et al., "Bit Error Probability of Trellis--Coded Quadrature Amplitude Modulation Over Cross--Coupled Multidimensional Channels," IEEE Global Telecommmmunications Conference, Houston, Texas, Dec. 1-4, 1986, vol. 2, pp. 1015–1022.

*Primary Examiner*—Stephen Chin
*Assistant Examiner*—Young Tse
*Attorney, Agent, or Firm*—Barry R. Lipsitz

[57] ABSTRACT

Punctured binary convolutional codes are used in a trellis coded modulation scheme to achieve spectral efficiencies as high as those of multi-dimensional codes, using simple hardware. A base rate ½ binary convolutional code is punctured to rate n/k. The output of the punctured encoder is mapped to a four-way partition of a $2^N$ point two-dimensional QAM constellation. The four-way partition consists of a two-way partition in both the I and Q dimensions. The two-way partitions of each dimension are used to transmit the two level output of the rate n/k binary convolutional coder. (N−2) "uncoded" bits are transmitted by selecting the unique constellation point in a partition group. The code has an average throughput of (N−2)+2n/k bits per symbol. The invention is also applicable to trellis coded amplitude modulation schemes based on $2^N$ possible amplitude levels provided along a one-dimensional constellation.

20 Claims, 7 Drawing Sheets

APPARATUS AND METHOD FOR COMMUNICATING DIGITAL DATA USING TRELLIS CODING WITH PUNCTURED CONVOLUTIONAL CODES

BACKGROUND OF THE INVENTION

The present invention relates to the communication of digital data using trellis coded amplitude modulation (AM) and trellis coded quadrature amplitude modulation (QAM) with punctured convolutional codes. One of the various applications for which the present invention is particularly well suited is in the transmission of digital television signals.

Digital data, for example, digitized, compressed television (NTSC) or high-definition television (HDTV) signals can be transmitted over terrestrial very high frequency (VHF), ultra-high-frequency (UHF), or cable television analog channels to end users. Analog channels deliver corrupted and transformed versions of their input waveforms. Corruptions of the waveform include linear, frequency-selective amplitude and phase distortion, nonlinear or harmonic distortion, and multiplicative fading. Additive corruption of the waveform, due to statistical thermal and impulse noise, may be countered using forward error correction codes.

In order to communicate digital data via an analog channel, the data is modulated using, for example, a form of pulse amplitude modulation (PAM). Typically, quadrature amplitude modulation or single-sideband (SSB) modulation is chosen to efficiently use the available channel bandwidth. QAM is a quadrature, or orthogonal combination of two PAM signals. When viewed as coordinates of a plane, the combined PAM signals form a "constellation" of possible transmission levels. Each transmitted constellation point is called a symbol. For example, two independent, quadrature four-level AM signals form a 16-QAM constellation which encodes four bits. A 32-point constellation can be formed with dependent six-level AM quadrature signals, encoding five bits per symbol.

In pulse amplitude modulation, each signal is a pulse whose amplitude level is selected from a fixed set of levels. In 16-QAM, each of the quadrature PAM signals select from uniformly spaced, bipolar amplitudes scaled from amplitude levels -3, -1, 1, 3. Spectral efficiency in digital communication systems is defined as the number of transmitted information bits per second per unit of bandwidth, i.e., the ratio of the data rate to the bandwidth. Modulation systems with very high bandwidth efficiency are employed in applications that require high data throughput with small available bandwidth. QAM and SSB provide bandwidth efficient modulation, which can provide very low bit error rates when used with high efficiency forward error correction codes such as trellis coded modulation (TCM).

Trellis coded modulation has evolved as a combined coding and modulation technique for digital transmission over band limited channels. Unlike traditional application of convolutional codes to two-level PAM which increase the bandwidth used in transmission, TCM increases the constellation size instead. In TCM schemes, a sequence of "coded" bits are convolutionally encoded into a sequence of groups which partition the symbol constellation. For each encoded group, a number of "uncoded" bits are transmitted by selecting a unique constellation element of the group. At a receiver, the sequence of transmitted groups is decoded by a soft-decision maximum likelihood (ML) convolutional code decoder. Such TCM schemes can improve the robustness of digital transmission against additive noise by three to six dB or more, compared to uncoded modulation at the same information rate.

Most TCM schemes map one step of the convolutional code trellis to one transmission symbol which consists of two QAM components (I, Q). Such two-dimensional (2-D) codes achieve a throughput of an integer number of information bits per 2-D symbol. It is desirable to increase the TCM throughput by increasing the integer number of coded bits per symbol by some fraction. Schemes have evolved which combine two 2-D symbols to form 4-D symbols, four 2-D symbols to form 8-D symbols, and so on, to obtain fractionally higher throughputs. These "multi-dimensional" codes achieve higher spectral efficiencies at the cost of much increased decoder complexity. Such complexity results from the need to compute soft-decisions of each multi-dimensional group within the constellation and the need to build a custom convolutional decoder of a rate n/k code, where n/k represents the fractional throughput to be provided.

In many data communications applications requiring a very low probability of bit error, a concatenation of two forward error correction codes is often used. An "inner" soft-decision code is used on the noisy channel to deliver a modest symbol error rate to an "outer" decoder. A known approach is to use a convolutional or trellis code as the inner code with some form of the "Viterbi algorithm" as a trellis decoder. The outer code is most often a t-symbol correcting "Reed-Solomon" or other algebraic block code. Such codes are well known in the art. The outer decoder removes the vast majority of symbol errors that have eluded the inner decoder in such a way that the final output error rate is extremely small.

With concatenated coding, the inner code typically needs to provide only three to four dB of coding gain, before sending the partially corrected data to the outer code. Multi-dimensional codes, which achieve higher throughput rates than 2-D trellis codes, are designed to approach six dB coding gain at high signal-to-noise ratios (SNR).

It would be advantageous to be able to achieve the spectral efficiencies of multi-dimensional codes without having to compute the soft-decisions of a plurality of multi-dimensional groups, and without having to build a convolutional decoder of a rate n/k instead of a rate 1/m. It is known that high rate n/k convolutional codes can be implemented for traditional two-level modulation (e.g., BPSK) with bandwidth expansion using punctured rate 1/m codes. However, application of punctured convolutional codes to nonbandwidth expanding TCM has only recently been considered. One such scheme is disclosed in commonly assigned, co-pending U.S. patent application Ser. No. 07/912,542 filed on Jul. 13, 1992 for "Apparatus and Method for Communicating Digital Data Using Trellis Coded QAM with Punctured Convolutional Codes," incorporated herein by reference.

The present invention provides a communication scheme that enjoys the aforementioned advantages. In particular, the present invention takes advantage of the reduced coding gain requirement for TCM when concatenated with an outer code. The invention also applies punctured convolutional codes to TCM by puncturing a standard rate ½ convolutional decoder to achieve fractional rate n/k throughputs, where n/k can be any desired value less than one.

SUMMARY OF THE INVENTION

In accordance with the present invention, apparatus is provided for communicating digital data using trellis coded QAM based on a $2^N$ point two-dimensional QAM constellation where N is an integer greater than one, at a symbol rate of $F_S$ QAM symbols per second. The apparatus includes means for splitting an original information data stream provided at a data rate of $((N-2)+2n/k)F_S$ bits per second into a first "uncoded" information stream having a data rate of $(N-2)F_S$ bits per second and a second "coded" information stream having a data rate of $(2n/k)F_S$ bits per second, where n/k is a punctured rate of a binary convolutional code and has a value less than one. Means are provided for encoding the second information stream using the punctured rate n/k binary convolutional code. The encoded second information stream is buffered to provide two encoded bits per QAM symbol. The first information stream is buffered to provide $(N-2)$ uncoded bits per QAM symbol. Means responsive to the buffered first and second information streams provide successive QAM symbols, each QAM symbol consisting of orthogonal in-phase (I) and quadrature-phase (Q) components derived from two of the buffered encoded bits and $(N-2)$ of the buffered uncoded bits. The two buffered encoded bits designate one of four symbol groups provided in the QAM constellation for partial identification of the QAM symbols. Means are provided for transmitting the successive QAM symbols via a communication channel.

The means for providing successive QAM symbols can comprise a symbol map that is addressed by successive N bit addresses comprising $(N-2)$ uncoded bits from the buffered first information stream and two encoded bits from the buffered second information stream. The symbol map outputs symbols in response to the successive addresses.

Decoder apparatus is provided for use in decoding symbols transmitted by the transmitting means. The decoder apparatus includes means for receiving the transmitted QAM symbols from the communication channel. The received symbols are corrupted by noise introduced by the channel. Means are provided for digitizing the received symbols to provide digital data representative of the I and Q components for processing in first and second receiver paths. The first receiver path includes means for delaying the digital data. The second receiver path includes (i) means for converting the digitized I and Q components into branch metrics, and (ii) means for convolutionally decoding the branch metrics at the punctured rate n/k to recover the second information stream. The recovered second information stream is convolutionally reencoded at the punctured rate n/k to provide a stream of successive two-bit symbol group identifiers representing best estimates of the symbol groups used to partially identify the transmitted QAM symbols. Means are provided for buffering the stream of successive two-bit symbol group identifiers for synchronization with the delayed digital data in the first receiver path. Means responsive to the stream of successive two-bit symbol group identifiers slice successive $(N-2)$ uncoded bit portions of delayed data from the first receiver path. The sliced $(N-2)$ uncoded bit portions are multiplexed with the second information stream recovered in the second receiver path to reconstruct the original information data stream.

The branch metrics provided in the second receiver path can comprise components that represent the probability that the I component of a received QAM symbol designates a transmitted I=0 or I=1 group of symbols from the QAM constellation and the probability that the Q component of the received QAM symbol designates a transmitted Q=0 or Q=1 group of symbols from the QAM constellation. The combination of an I and Q group of symbols designates one of the four symbol groups provided in the QAM constellation. In the illustrated embodiment, the component metrics are generated using a transfer function having a characteristic with periodic peaks and valleys along I and Q amplitude axes of the QAM constellation. The peaks and the center of the valleys reside at symbol group amplitude levels along the axes.

The illustrated embodiment also differentially encodes the second information stream and uses a symbol map that comprises a four-way two-dimensional QAM partition that is 180° rotationally invariant with respect to the uncoded bits contained in the symbol map addresses. In such an embodiment, the second receiver path includes means for differentially decoding the recovered second information stream for input to the multiplexing means. The first receiver path delays the digital data by $D/(2n/k)$ symbols, where D is substantially the delay inherent in the second receiver path. The means for digitizing the received symbols provide quantized digital data. The first receiver path can include means for further quantizing the digital data, to allow the first receiver path delay means to be simplified.

Apparatus is also provided for communicating digital data using trellis coded amplitude modulation based on $2^N$ possible amplitude levels (i.e., $2^N$ AM) provided along a one-dimensional constellation. The amplitude levels are represented by symbols transmitted at a rate of $F_S$ symbols per second. The apparatus comprises means for splitting an original information data stream provided at a data rate of $((N-1)+n/k)F_S$ bits per second into a first "uncoded" information stream having a data rate of $(N-1)F_S$ bits per second and a second "coded" information stream having a data rate of $(n/k)F_S$ bits per second, where n/k is a punctured rate of a binary convolutional code. Means are provided for encoding the second information stream using the punctured rate n/k binary convolutional code. The first and second information streams are buffered to provide $(N-1)$ uncoded bits and one encoded bit per symbol. Means responsive to the buffered first and second information streams provide successive symbols derived from one encoded bit and $(N-1)$ uncoded bits. The one encoded bit designates one of two symbol groups provided in the constellation for partial identification of said symbols. Means are provided for transmitting the successive symbols via a communication channel.

A receiver is also provided for the $2^N$ AM modulation scheme. Symbols communicated using trellis coded amplitude modulation based on a $2^N$ point one-dimensional constellation are received and digitized to provide digital data. A first receiver path carries the digital data. A second receiver path carries the digital data and includes (i) means for generating component metrics from the digital data, (ii) means for grouping the component metrics with erasures to form branch metrics of a rate ½ trellis, and (iii) a rate ½ convolutional decoder punctured to rate n/k for convolutionally decoding the branch metrics to recover an information stream. The recovered information stream is convolutionally reencoded at the punctured rate n/k to provide a stream of successive one-bit symbol group identifiers. Each identifier represents the best estimate of a symbol group of the constellation that partially identifies a received symbol. Means are provided for synchronizing the stream of successive one-bit symbol group identifiers and the digital data in the first receiver path. Means responsive to the synchronized stream of successive one-bit symbol group identifiers slice successive (N−1) uncoded bit portions of data from the first receiver path. The sliced (N−1) uncoded bit portions are multiplexed with the information stream recovered in the second receiver path to reconstruct a desired data stream.

Methods are provided for communicating digital data using trellis coded QAM based on a $2^N$ point two-dimensional QAM constellation, at a symbol rate of $F_S$ QAM symbols per second, and for receiving the transmitted QAM symbols from a communication channel, corrupted by noise. Digitized I and Q components of received QAM symbols are converted into branch metrics by generating component metrics from the digitized I and Q components. Erasures are inserted into the component metrics, and grouped with the component metrics into groups of two to form branch metrics of a rate ½ trellis. The branch metrics are convolutionally decoded using a rate ½ decoder punctured to rate n/k.

DESCRIPTION OF THE PREFERRED EMBODIMENTS

The present invention provides a method for communicating digital data using trellis coded QAM. Symbols are coded for transmission using a rate ½ convolutional encoder punctured to rates n/k>½. Where the trellis coded QAM is based on a $2^N$ point two-dimensional QAM constellation, an average of (N−2) uncoded and n/k coded bits are transmitted by each QAM symbol. Thus, for example, for a 32-QAM embodiment, an average of three uncoded and 2 n/k coded bits are transmitted by each symbol. For a 64-QAM embodiment, an average of four uncoded and 2 n/k coded bits are transmitted by each symbol. The 2 n/k bits are convolutionally encoded and modulated as two-level symbol groups on the I and Q components. The uncoded bits select the unique constellation point of the symbol groups. The coded symbols are transmitted, and received at a receiver. At the receiver, the received symbol is quantized into soft-decisions from which branch metrics are generated for the two-level I and Q decisions.

The QAM constellation is partitioned into two groups in the I dimension and two groups in the Q dimension, such that the minimum intersymbol distance in the partitioned dimension is $2\Delta_0$. The output of the punctured convolutional encoder is bit serialized, then grouped into pairs, which are used to select the I and Q group of the transmit symbol. The uncoded bits are transmitted in each QAM symbol by selecting the specific I or Q level of each group.

There are four symbol groups per QAM constellation. These are defined by the combination of two one-bit I and Q symbol groups, providing a two-bit binary number for selecting one of four symbol groups within the QAM constellation. The encoding of 2 n/k coded information bits to an I and Q symbol group is an average process over several symbols. A conventional first-in, first-out (FIFO) buffering scheme is used in the physical implementation of the encoder to accomplish the averaging.

Figure 1:
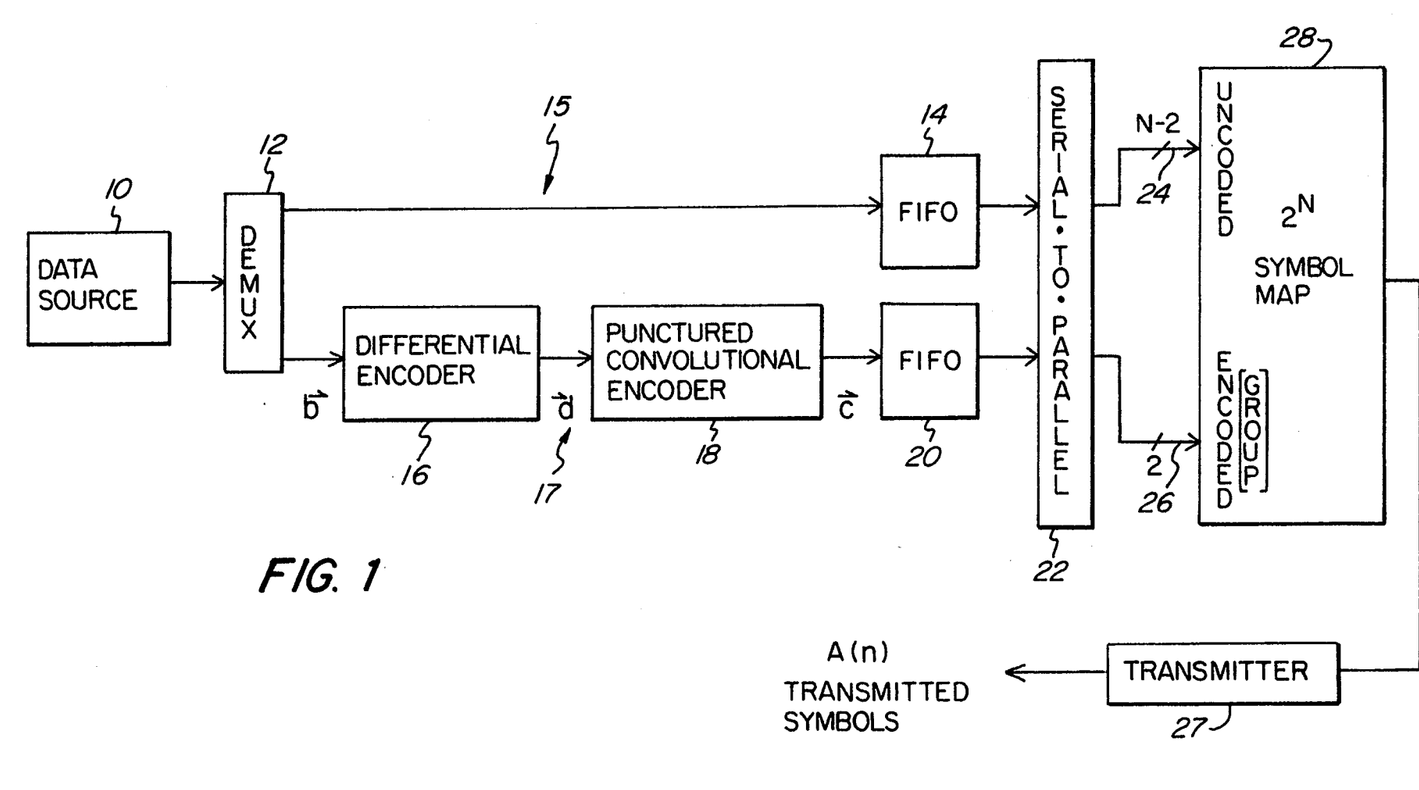
FIG. 1 is a block diagram of a trellis coded QAM encoder in accordance with the present invention.

The encoder is shown in FIG. 1. An original, serialized information bit stream from a data source 10 is input to a demultiplexer 12 at a data rate of $((N-2)+2n/k)F_S$ bits per second. $F_S$ is the symbol rate of the QAM symbols. The demultiplexer splits the data into a first "uncoded" information bit stream of rate $(N-2)F_S$ bits per second and a second "coded" bit stream of rate $(2n/k)F_S$ bits per second. The first information bit stream is carried on a first encoder path generally designated 15. The second information bit stream is carried on a second encoder path generally designated 17.

The first information bit stream is buffered in a FIFO 14 for input to a serial-to-parallel converter which outputs (N−2) bits per symbol via line 24. The second information bit stream is differentially encoded in a differential encoder 16, and then encoded using a punctured convolutional encoder 18. Encoder 18 is advantageously a conventional rate ½ convolutional encoder, that is punctured to a rate n/k. The encoded second information stream output from encoder 18 is buffered in a FIFO 20 for input to serial-to-parallel converter 22. Converter 22 provides two encoded bits per symbol (i.e., one I-Q symbol group) on line 26. The (N−2) uncoded bits and two encoded bits output from serial-to-parallel converter 22 are used to address a $2^N$ symbol map 28 which can comprise, for example, a ROM. Symbol map 28 outputs successive QAM symbols A(n) based on successive N-bit addresses.

The trellis coded modulation scheme implemented by the encoder of FIG. 1 transmits, via transmitter 27, an average of 2n/k coded bits per QAM symbol over a period of several symbols. The averaging function is accomplished by buffers 14, 20 and corresponding buffering structures in the decoder hardware. The encoder function can be described in vector terms. Specifically, the "coded" bit stream input to differential encoder 16 from demultiplexer 12 can be labeled as vector $b=b_0, b_1, b_2, \ldots$, which represents the sequence starting at time zero. The differential encoder differentially encodes the data stream with a transfer function $1 \oplus D$ into a vector $d=d_0, d_1, d_2, \ldots$. The differential encoding of the coded bit stream is used with a transparent convolutional code and a 180° rotationally invariant uncoded bit mapping of the constellation partition. This makes the TCM scheme unaffected by 180° rotations between the transmit and receive symbol sequences. Such a trellis code is referred to as being 180° rotationally invariant.

The differentially encoded sequence $d$ is input into the rate n/k punctured convolutional encoder, resulting in an output vector $c = c_0, c_1, c_2, \ldots$. The bit sequence $c$ is input into the FIFO at an average rate of two bits/baud interval, and is read out in pairs ($C_{2n}, C_{2n+1}$) at each baud interval. In this notation, the designation (n) indexes the baud interval, $t = nT_b$, where $T_b$ is the baud period. The first element of the pair, $C_{2n}$, selects the I group as a zero or one. The second element of the pair, $C_{2n+1}$ chooses the Q group as a zero or one. The I, Q group selections are illustrated in the following table:

TABLE 1

| | I, Q Group Selections | | |
|---|---|---|---|
| $C_{2n}$ | $C_{2n+1}$ | I Group | Q Group |
| 0 | 0 | I = 0 | Q = 0 |
| 0 | 1 | I = 0 | Q = 1 |
| 1 | 0 | I = 1 | Q = 0 |
| 1 | 1 | I = 1 | Q = 1 |

Figure 3A:
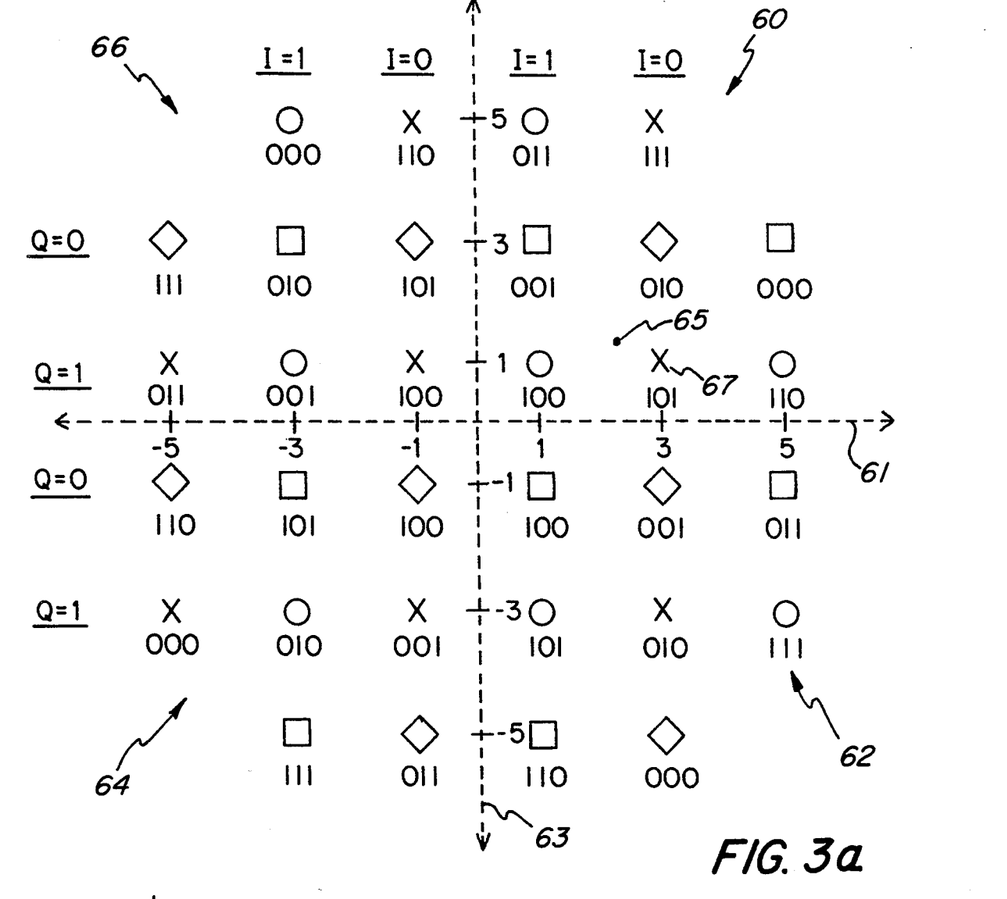
FIG. 3a is an illustration of a 32-QAM two-dimensional constellation showing the four symbol groups used in accordance with the present invention.
Figure 3B:
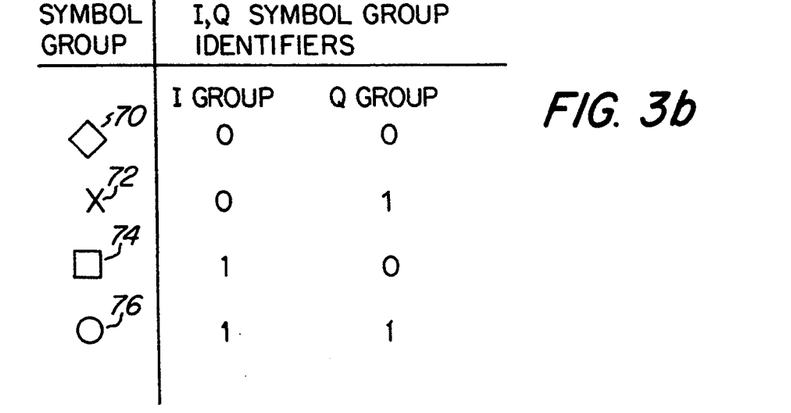
FIG. 3b is a legend illustrating the symbol groups identified by I group and Q group identifiers.

The combinations of I and Q group selections are illustrated in FIGS. 3a, 3b for a 32-QAM embodiment. The constellation for a 64-QAM embodiment is provided in FIG. 5, with the same I, Q symbol group mappings illustrated in FIG. 3b. As can be seen by comparing FIGS. 3a and 3b, the I, Q group selections function as symbol group identifiers to identify one of four different symbol groups. The symbol groups are illustrated as a ○ 70, an X 72, a □ 74, and a ◇ 76. The combinations select one of the four-way partition groups of the constellation pattern. In the 32-QAM embodiment of FIG. 3a, the constellation is partitioned into four quadrants 60, 62, 64 and 66. Each column of the constellation corresponds to either an I=1 group or I=0 group. As illustrated in FIG. 3a, the I=1 group identifies either a circle or a square. The I=0 group identifies a cross or a diamond. Similarly, the rows of the constellation pattern correspond to either a Q=0 or a Q=1 group. The Q=0 group designates either a diamond or a square. The Q=1 group identifies either a cross or a circle. This is consistent with the designations set forth in FIG. 3b.

Figure 5:
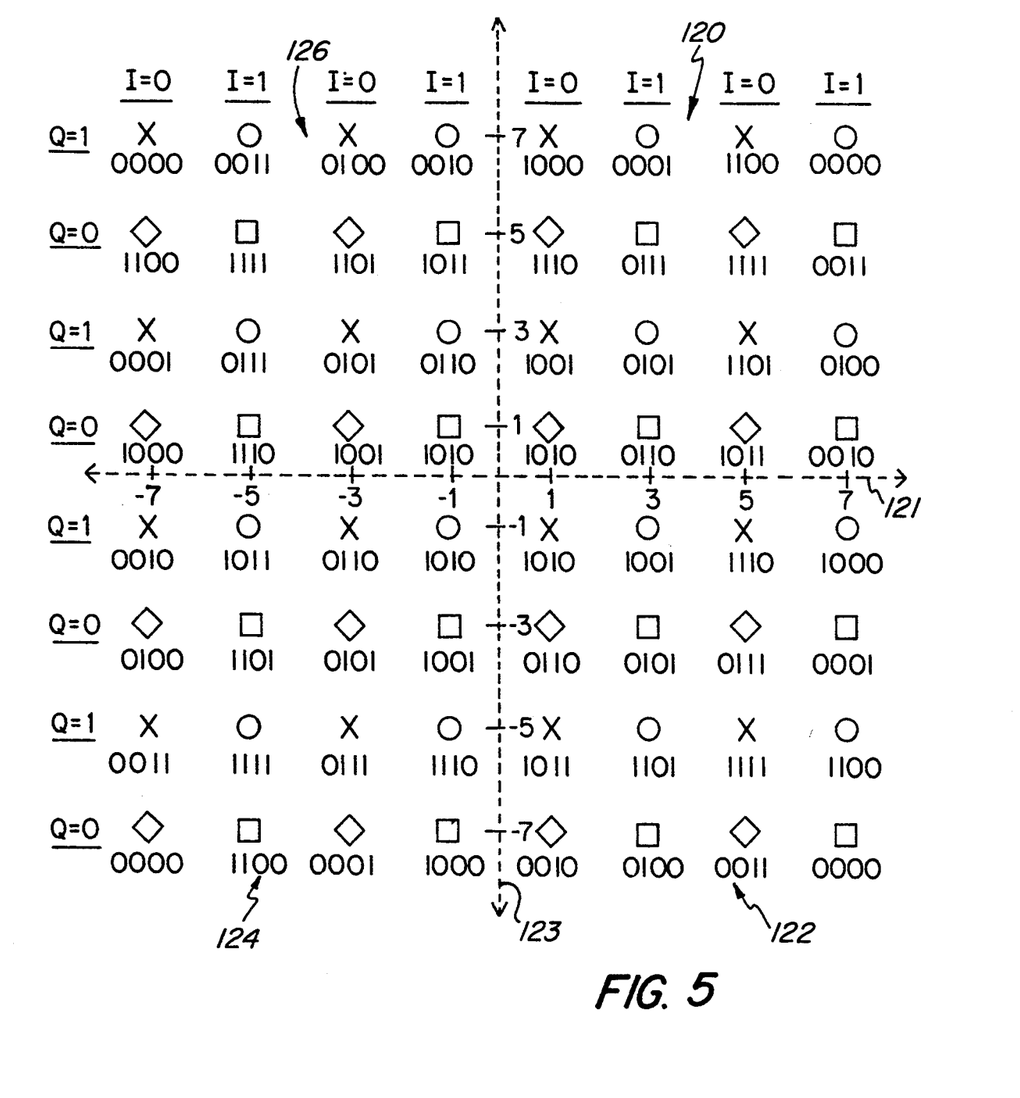
FIG. 5 is a 64-QAM two-dimensional constellation pattern illustrating the four symbol groups used in accordance with the present invention.

The 64-QAM constellation of FIG. 5 is similar to that of FIG. 3. The constellation is partitioned into four quadrants 120, 122, 124, 126. The columns of the constellation correspond to I=0 or I=1 groups and the columns correspond to Q=1 or Q=0 groups. In both the 32-QAM constellation of FIG. 3a and the 64-QAM constellation of FIG. 5, the uncoded bits are designated under each symbol. As is clear from the figures, each symbol in the 32-QAM embodiment carries three uncoded bits and each symbol in the 64-QAM embodiment carries four uncoded bits.

The transmission of I=0 or I=1 groups on the in-phase component of the QAM constellation and Q=0 or Q=1 groups on the quadrature component of the QAM constellation allows the transmission of a pair of two-level signals independently in each QAM baud interval. The Euclidean distance between the "1" and "0" levels on either axis is $\Delta_0$. The two-level transmission channel is used to transmit the convolutionally encoded sequence $c$.

The (N−2) uncoded bits $\{u_{(N-2)n}, u_{(N-2)n+1}, \ldots u_{(N-2)n+(N-3)}\}$ are read from the FIFO at symbol n, and are used to select the unique constellation point in the chosen I-Q partition group. The (N−2) uncoded bits read out at symbol n can be labeled $u_n = \{u_{(N-2)n}, u_{(N-2)n+1}, \ldots u_{(N-2)n+(N-3)}\}$. The mapping of the nth transmitted symbol is a function of the coded and uncoded bits read out of the FIFOs 14, 20 at time n, $A_{(n)} = \text{map}[c_{2n}, c_{2n+1}, U_n]$. The mapping is presented graphically in FIGS. 3a and 3b for 32-QAM and FIG. 5 for 64-QAM. The uncoded bits are spaced at a distance of at least 2 $\Delta_0$, where $\Delta_0$ is the minimum constellation spacing. This yields a six dB gain over the uncoded constellation, and a three dB gain over an uncoded constellation of size $2^{N-1}$. Thus, for example, two squares 74 will never be next to each other; they will always be separated by at least one other symbol. The same holds true for each of the other symbols 70, 72, 76 illustrated.

Figure 2:
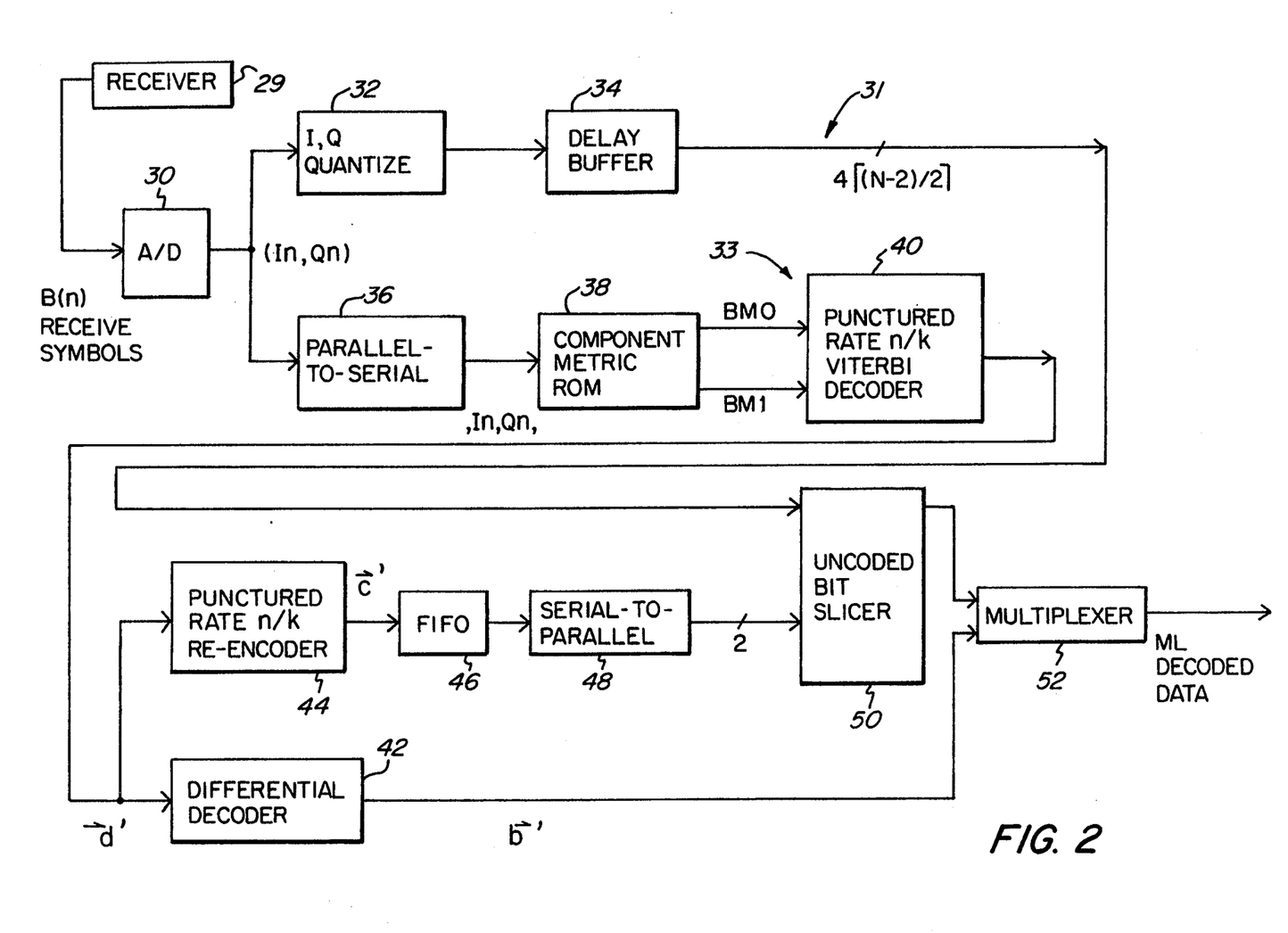
FIG. 2 is a block diagram of a decoder for the QAM symbols transmitted from the encoder of FIG. 1.

FIG. 2 illustrates a TCM decoder in accordance with the present invention. A received symbol sequence B(n) represents the transmitted sequence A(n) with additive white Gaussian noise, such that B(n)=A(n)+N(n). The symbols received by receiver 29 are input to an analog-to-digital (A/D) converter 30 that quantizes the symbols with a uniform m-bit resolution in each component (I,Q) to yield the sequence of pairs ($I_n, Q_n$). The data is then sent down a first receiver path generally designated 31 and a second receiver path generally designated 33. Path 31 corresponds to the "uncoded" data path at the encoder, and path 33 corresponds to the "coded" path at the encoder. The coded bit sequence, transmitted using the n/k convolutional code, must be decoded before the uncoded bits carried in first receiver path 31 can be sliced. The term "sliced" as used herein refers to the recovery of the uncoded bits after it is known from which I-Q group the transmitted constellation point was chosen.

Figure 6A:
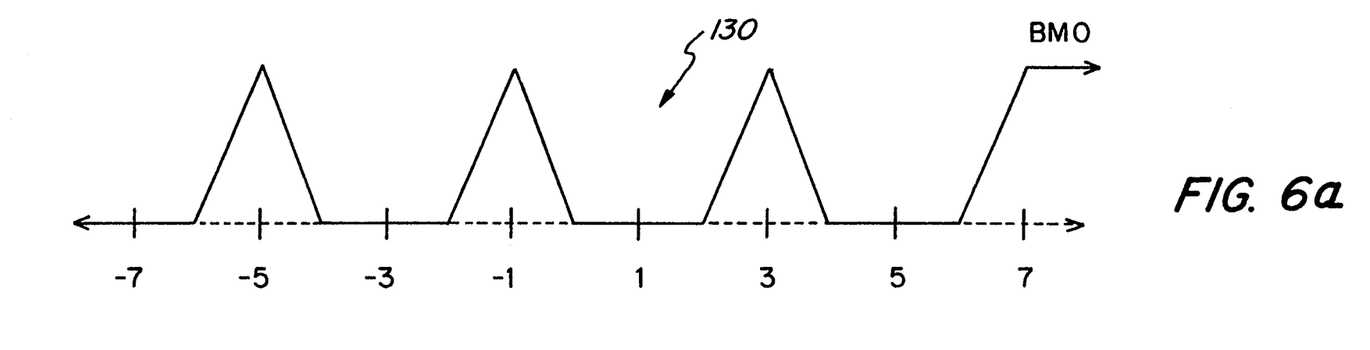
FIGS. 6a and 6b illustrate a transfer function used for generating component metrics in the 64-QAM embodiment.
Figure 6B:
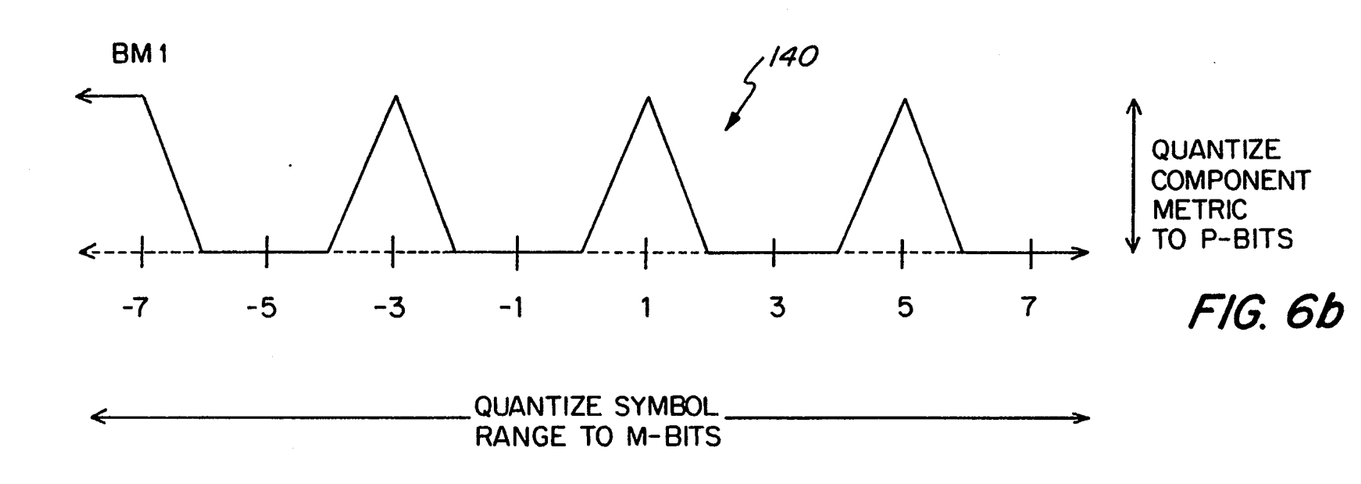

Second receiver path 33 includes a parallel-to-serial converter 36 which re-serializes the two-level data transmitted as I and Q groups. In accordance with the encoding sequence, the ($I_n, Q_n$) pairs are parallel-to-serial converted into the alternating sequence $I_n, Q_n, I_{n+1}, Q_{n+1}\ldots$ This sequence is the noise corrupted, quantized version of the modulated sequence of $C_{2n}, C_{2n+1}, C_{2n+2}, C_{2n+3}\ldots$ The $I_n, Q_n$ quantizations are first converted into component metrics using a look up table in component metric ROM 38. The component metrics represent the log-likelihood of the transmitted group values $C_{2n}, C_{2n+1}$. This conversion from n-bit quantization to p-bit component metric is accomplished by a ROM of maximum size $p \times 2^m$ bits representing the transfer characteristic of FIGS. 4a and 4b for the 32-QAM embodiment, and the transfer characteristic of FIGS. 6a and 6b for the 64-QAM embodiment.

Figure 4A:
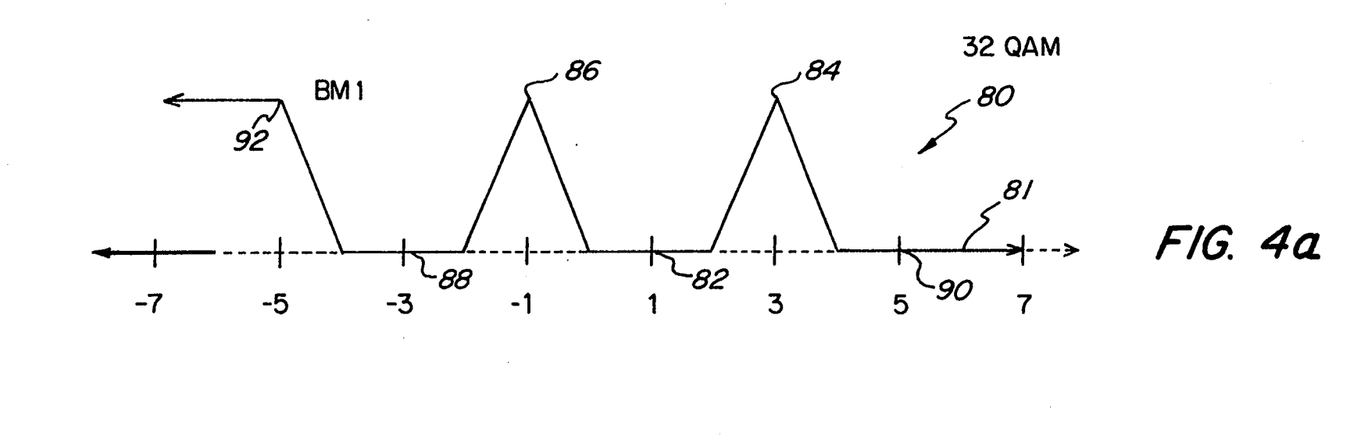
FIGS. 4a and 4b illustrate a transfer function used for generating component metrics in accordance with a 32-QAM embodiment of the present invention.
Figure 4B:
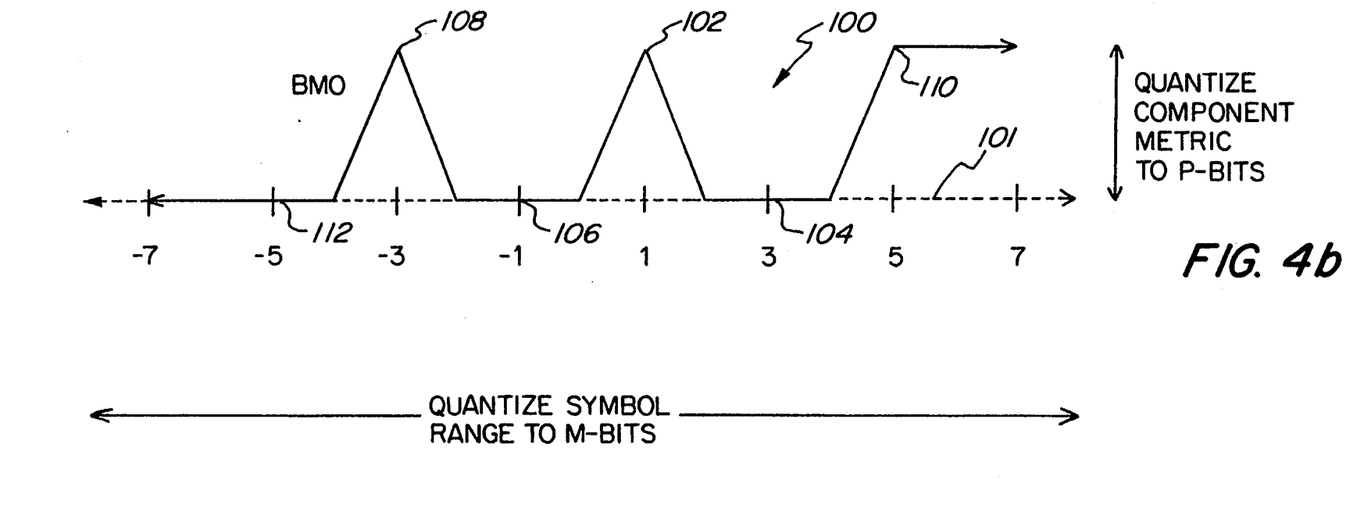

As illustrated in FIGS. 4a and 4b, the transfer functions generally designated 80 (branch metric 1) and 100 (branch metric 0) have characteristics with periodic peaks and valleys along the I and Q amplitude axes of the QAM constellation. In FIG. 4a, the peaks 84, 86, 92 and the center of the valleys 82, 88, 90 reside at symbol group amplitude levels along the axis 81. Similarly, in FIG. 4b, the peaks 102, 108, 110 and the center of the valleys 104, 106, 112 reside at symbol group amplitude levels along axis 101. Note that axes 81 and 101 specify amplitude levels that are identical to the I and Q axes 61, 63 in FIG. 3a. For the 64-QAM embodiment, transfer functions 130, 140 illustrated in FIGS. 6a and 6b have the same general properties as transfer functions 80 and 100 for the 32-QAM embodiment. However, the transfer functions for the 64-QAM embodiment each have an additional peak and valley, to accommodate the additional amplitude levels (7, −7) on each of the I and Q axes 121, 123 illustrated in FIG. 5.

As indicated above, the component metrics are an indication of the probability that a received symbol comprises an I=1 group or an I=0 group, and the probability that the symbol represents a Q=1 group or a Q=0 group. As an example, refer to the received symbol point 65 in FIG. 3a. This symbol was received at an I amplitude of 2.5 and a Q amplitude of 1.5. It is the job of the decoder to determine which transmitted symbol the received symbol corresponds to. Turning to FIGS. 4a and 4b, it can be seen that for an I amplitude of 2.5, branch metric 1 ($bm_1$) will have a value of one-half the peak (all branch metric values are normalized to a peak of one). Similarly, branch metric 0 ($bm_0$) is zero when the I component of a received symbol has an amplitude of 2.5. When branch metric 0 is zero, it is probable that the received symbol represents an I=0 symbol group identifier. If $bm_1$ were zero, then it would be likely that the received symbol represents an I=1 symbol group identifier. In the present example, $bm_0=0$, so that the received symbol probably resides in the I=0 group.

Applying the same process for the Q component, Q in the present example has an amplitude of 1.5. Thus, referring to FIG. 4a, $bm_1=0$. Referring to FIG. 4b, $bm_0=0.5$. Since $bm_1=0$, it is likely that the received symbol represents a Q group of one. Thus, it is probable that received symbol 65 represents an I group of zero and a Q group of one. Referring to FIG. 3b, for an I,Q of 0,1, the symbol is a cross, as designated at 72. Thus, it is probable that received symbol 65 is from the cross symbol group, and further the most likely cross symbol will be sliced as symbol 67 in FIG. 3a (uncoded bits 101).

Branch metric components $bm_0$ and $bm_1$ are reconstructed with inserted erasures and are decoded by a punctured rate n/k Viterbi decoder 40. Such decoders are well known in the art, as illustrated by the article, "High-Rate Punctured Convolutional Codes for Soft-Decision Viterbi Decoding," *IEEE Transactions on Communications*, March, 1984, pp. 315–319.

The branch metric component characteristics are based on the scaled, negative logarithms of the conditional probabilities that a "0" or "1" symbol group was transmitted given the received symbol quantization x. In addition to scaling the log-probabilities, the transfer characteristic described above in connection with FIGS. 4a, 4b and 6a, 6b is designed to represent only the difference between the $bm_0(x)$ and $bm_1(x)$. Specifically, for all values of quantization x, a constant is subtracted from the pair of log-likelihoods such that the smaller of the two metrics is set to zero. These differential metrics improve the performance of the Viterbi decoder 40 which uses fixed bit-width arithmetic in computing its survivor paths. The $bm_0(x)$ and $bm_1(x)$ transfer characteristics may be simplified in a piecewise linear manner as illustrated in FIGS. 4a, 4b and 6a, 6b with transition points at the integers, and peaks set to the maximum branch metric value processed by the Viterbi decoder hardware.

Erasures for the punctured codes are inserted into the serialized component metrics by component metric ROM 38, and are grouped by twos to form branch metrics of a base rate ½ trellis. The metrics are processed by the Viterbi decoder, which outputs a maximum likelihood estimate of the differentially coded bit stream $\hat{d}$. The delayed estimate is represented as:

$$\hat{d} = z^{-D}d \oplus e_1$$

where D is the delay, in coded information bits, of the Viterbi decoder. The stream $\hat{d}$ is then differentially decoded by transfer function $1/(1 \oplus D)$ to yield estimate:

$$\hat{b} = z^{-D}b \oplus e_2$$

of the coded information stream. The error of the estimated vectors are designated by $e_1$ and $e_2$. z is the standard z-transform delay operator.

To slice the uncoded bits from a received symbol, it is beneficial to know from which I-Q group the transmitted constellation point was chosen. If the group is known, then the signal-to-noise ratio for slicing the unique symbol in the group, thus identifying the uncoded bits, is six dB better than the uncoded constellation spacing. The uncoded slicing gain is due to the inter-symbol spacing $2\Delta_0$ of the four-way partition, compared to the uncoded constellation spacing of $\Delta_0$. Note, for example, in FIG. 3a the uncoded bits "100" are all adjacent to each other, representing a spacing of $\Delta_0$, whereas none of the symbols within groups □, , , X are adjacent.

A good estimate of a symbol's I-Q group is obtained by reencoding the maximum likelihood estimate $\hat{d}$, of $d$. Such reencoding is provided by a punctured rate n/k reencoder 44, shown in FIG. 2. The estimate of the I-Q groups of the received symbol sequence is as good as the estimate $\hat{d}$, which is determined by convolutional code design at the Es/N0 range of interest. In the illustrated embodiment, $\hat{d}$, is reencoded into $\hat{c}$, by reencoder 44, and then buffered by FIFO 46 as in the encoder to produce the I-Q group estimates $$(C'_{2n}, C'_{2n+1}) = (C_{2n-Dk/2n}, C_{2n-Dk/2n+1}) + e_3(n).$$

Here, the index offset of Dk/2n represents the delay, in baud intervals, of the Viterbi decoder. To ensure that this is an integer number of symbols, the delay of the decoder may be increased by an interval of coded bits. The received symbols are pipeline delayed in the first receiver path 31 by Dk/2n symbols in a delay buffer 34 so that they can be sliced with the I-Q group estimates ($C'_{2n}, C'_{2n+1}$) as they become available.

Instead of delaying the entire 2m bits per symbol of the ($I_n, Q_n$) quantization in the uncoded path 31, it is advantageous to pare the information down in a quantizer 32 to reduce the delay line memory requirements. A simpler set of numbers to delay and process are the $i0_n, i1_n, q0_n, q1_n$ levels which represent the closest I=0 group amplitude level to the quantization $I_n$, the closest I=1 group amplitude to $I_n$, the closest Q=0 group amplitude to $Q_n$, and the closest Q=1 group amplitude to $Q_n$, respectively. These numbers are all the information that is required to slice the uncoded bits from the received symbol once the transmitted symbol group has been estimated at the output of serial-to-parallel converter 48 for input to the uncoded bit slicer 50. When quantizer 32 is provided in the first receiver path 31, the number of bits output from delay buffer 34 can be limited to 4(N−2)/2 bits by providing sufficient quantization. This will limit the amount of memory required by uncoded bit slicer 50 for each $i0_n$, $i1_n$, $q0_n$, $q1_n$ to $4(N-2)/2$ bits/symbol.

From $i0_n$, $i1_n$, $q0_n$, $q1_n$ it is straightforward to slice the uncoded bits given the I-Q transmit group output from serial-to-parallel converter 48 using a look up table. An example of such a look up table for the 32-QAM constellation illustrated in FIG. 3a is illustrated in the following table.

TABLE 2

| | | | | | Uncoded Bit Slicing | | | | | |
|---|---|---|---|---|---|---|---|---|---|---|
| i0 | q0 | $u_{I=0,Q=0}$ | i0 | q1 | $u_{I=0,Q=1}$ | i1 | q0 | $u_{I=1,Q=0}$ | i1 | q1 | $u_{I=1,Q=1}$ |
| −5 | −5 | (x,x,x) | −5 | −3 | (0,0,0) | −3 | −5 | (1,1,1) | −3 | −3 | (0,1,0) |
| −5 | −1 | (1,1,0) | −5 | 1 | (0,1,1) | −3 | −1 | (1,0,1) | −3 | 1 | (0,0,1) |
| −5 | 3 | (1,1,1) | −5 | 5 | (x,x,x) | −3 | 3 | (0,1,0) | −3 | 5 | (0,0,0) |
| −1 | −5 | (0,1,1) | −1 | −3 | (0,0,1) | 1 | −5 | (0,1,1) | 1 | −3 | (1,0,1) |
| −1 | −1 | (1,0,0) | −1 | 1 | (1,0,0) | 1 | −1 | (1,0,0) | 1 | 1 | (1,0,0) |
| −1 | 3 | (1,0,1) | −1 | 5 | (1,1,0) | 1 | 3 | (0,0,1) | 1 | 5 | (0,1,1) |
| 3 | −5 | (0,0,0) | 3 | −3 | (0,1,0) | 5 | −5 | (x,x,x) | 5 | −3 | (1,1,1) |
| 3 | −1 | (0,0,1) | 3 | 1 | (1,0,1) | 5 | −1 | (0,1,1) | 5 | 1 | (1,1,0) |
| 3 | 3 | (0,1,0) | 3 | 5 | (1,1,1) | 5 | 3 | (0,0,0) | 5 | 5 | (x,x,x) |

The above look up table is stored in uncoded bit slicer 50, which can be a simple ROM.

In order to reconstruct the original information data stream input by data source 10 at the encoder (FIG. 1), the sliced (N−2) uncoded bit portions from uncoded bit slicer 50 are multiplexed in a multiplexer 52 with the decoded bits output from Viterbi decoder 40 after being differentially decoded in a differential decoder 42.

In general, two-dimensional trellis coding schemes double the symbol constellation size to introduce redundancy used in error correction at the decoder. Such constellation doubling costs a 3 dB penalty in signal-to-noise ratio, but results in an overall coding gain of up to 6 dB. Often, as in concatenated coding systems with a soft-decision inner code and an outer block code, the asymptotic coding gain of the inner code is not important. However, its coding gain at the outer code's threshold is important. Also important is the spectral efficiency or throughput rate of the code.

Figure 7:
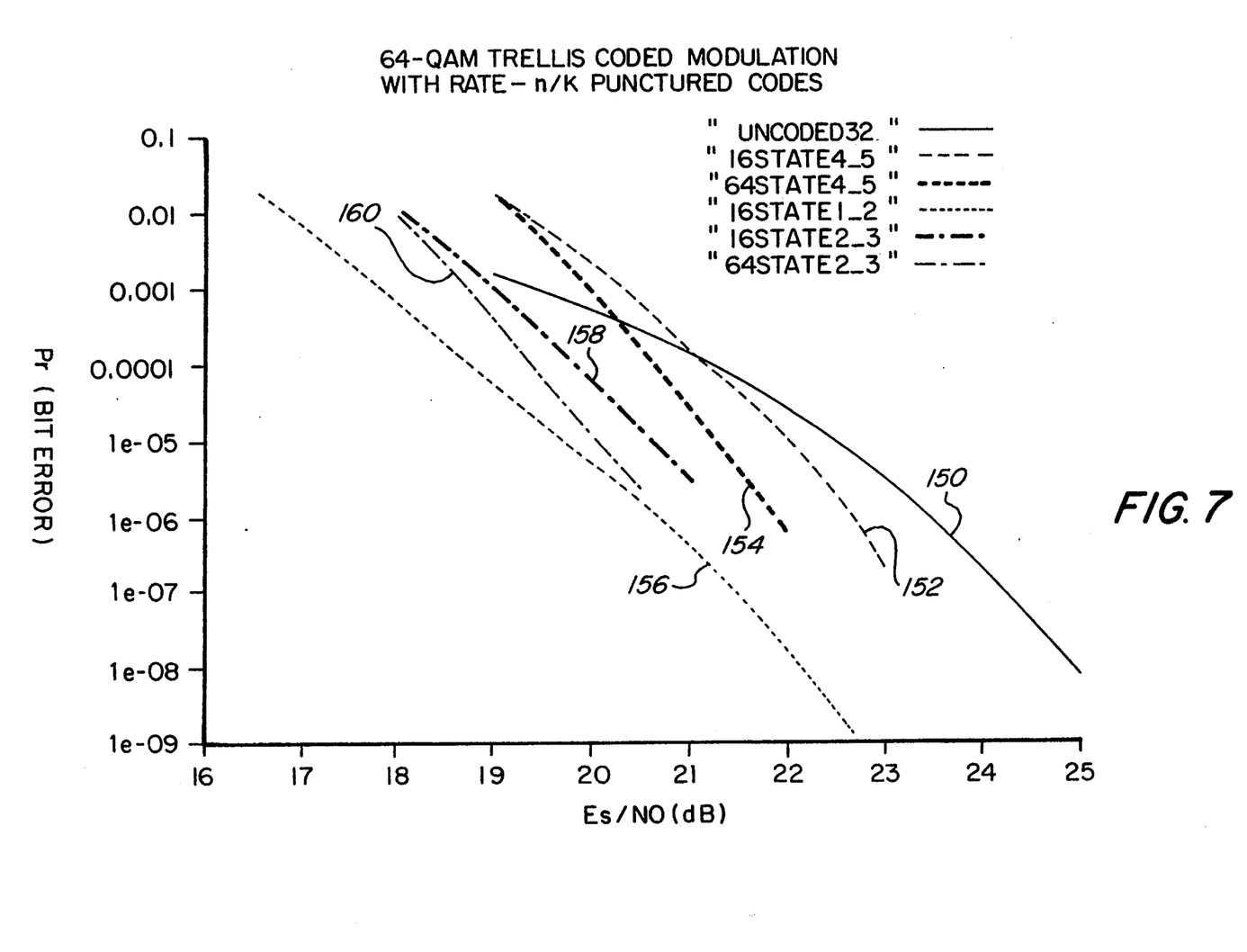
FIG. 7 is a graph plotting the bit error rate against signal-to-noise ratio (Es/NO) for different rate codes.

FIG. 7 illustrates the performance characteristics for various 64 QAM trellis coded implementations with rate n/k punctured codes. The curves of FIG. 7 show bit error rate (BER) versus the symbol signal-to-noise ratio (Es/N0) for the 64-QAM punctured trellis coding scheme embodiment of the present invention. Using a rate n/k=½ code, the TCM scheme transmits 5.0 bits per baud and quickly attains a 3 dB coding gain over uncoded 32-QAM. When an n/k=⅔ punctured code is used, spectral efficiency increases to 5.33 bits per symbol and asymptotic convergence to the uncoded bit performance is also rapid, especially for the 64-state code. The spectral efficiency (SE) is computed according to the formula SE=2n/k+(N−2) bits per symbol.

As higher rate n/k codes are used, spectral efficiency increases at the cost of reduced coding gain prior to asymptotic convergence. The benefit of the present invention can be seen in comparison to the uncoded QAM cost of 3 dB per bit. For example, using a 16-state n/k=½ code, a 2.7 dB coding gain is achieved over 32 QAM at a BER of $10^{-6}$. However, at the same Es/N0, use of a 64-state rate ⅔ code provides the same BER, as illustrated in FIG. 7, but with a higher throughput of 5.33 bits per baud for 64-QAM. All rate n/k codes with Hamming distances greater than or equal to four have an asymptotic coding gain of 3 dB.

The present invention represents an improvement over known multi-dimensional TCM techniques which require nonbinary mappings of direct rate n/k codes over several QAM baud intervals. Direct (nonpunctured) implementations of rate n/k codes become impractical where n≧2 in fully parallel, high-speed applications. The reason for this is that the required connections and computations for the survivor paths in the ACS array of the Viterbi decoder end up being extremely complex.

The present invention can also be applied to trellis coded amplitude modulation based on $2^N$ possible amplitude levels ($2^N$ AM) provided along a one-dimensional constellation. In such a scheme, the encoder of FIG. 1 and decoder of FIG. 2 are substantially unchanged. The only differences in the encoder are that the symbol map 28 is addressed by (N−1) uncoded bits via line 24 and by one encoded bit via line 26. The transmitted symbols A(n) comprise only I components, instead of I and Q components as described for the QAM embodiments.

The decoder for the $2^N$ AM scheme processes the successive I components in the second receiver path 33 to provide n/k decoded information bits per symbol instead of 2 n/k decoded information bits per symbol as in the QAM case. Only the I symbol group (one bit) is output to the uncoded bit slicer 50 from serial-to-parallel converter 48. The delay buffer 34 delays the quantized I components in the first receiver path 31 by Dk/n symbols instead of Dk/2n symbols as in the QAM case. (N−1) uncoded bits are sliced for each symbol by uncoded bit slicer 50.

The data rate of the original information data stream in the $2^N$ AM embodiment is $((N-1)+n/k)F_S$ bits per second. The uncoded path processes the information stream at a data rate of $(N-1)F_S$ and the coded path processes the information stream at a data rate of $(n/k)F_S$ bits per second. The encoded bit in the $2^N$ AM scheme designates one of two symbol groups provided in the constellation for partial identification of the received symbols, as compared to the designation of one of four symbol groups ( , X, □, ) by the two encoded bits in the QAM embodiment. In both schemes, the symbols are fully identified by the symbol group and uncoded bits.

It should now be appreciated that the present invention provides a method and apparatus for using the technique of puncturing rate 1/m codes into rate n/k codes to simplify the decoding hardware in a multi-dimensional trellis coded modulation scheme. Whereas traditional multi-dimensional codes use more dimensions (4-D, 8-D, 16-D, etc.) to transmit at higher spectral efficiencies, the present invention provides a higher rate using a two-dimensional constellation with punctured codes. As a result, decoder complexity is drastically reduced. Indeed, the Viterbi decoder used at the receiver can be a standard, commercially available decoder with direct branch metric inputs to enable puncturing for use with a variety of rate n/k codes. The technique of the present invention works by partitioning a two-dimensional constellation into four groups, and using the groups to modulate two independent BPSK-like signals per two-dimension transmit symbol. The BPSK-like signals transmit the convolutional code within the QAM framework, and rate buffers allow any convolutional code rate n/k to be used. For a $2^N$ point two-dimensional QAM constellation, an average throughput rate of $(N-2)+2n/k$ bits per symbol is provided.

Although the invention has been described in connection with various specific embodiments, those skilled in the art will appreciate that numerous adaptations and modifications may be made thereto, without departing from the spirit and scope of the invention as set forth in the claims.

What is claimed is:

1. Apparatus for processing digital data for transmission using trellis coded quadrature amplitude modulation (QAM) based on a $2^N$ point two dimensional QAM constellation where N is an integer greater than one, at a symbol rate of $F_S$ QAM symbols per second, comprising:

means for splitting an original information data stream provided at a data rate of $((N-2)+2n/k)F_S$ bits per second into a first "uncoded" information stream having a data rate of $(N-2)F_S$ bits per second and a second "coded" information stream having a data rate of $(2n/k)F_S$ bits per second, where n/k is a punctured rate of a binary convolutional code and has a value less than one;

means for encoding said second information stream using said punctured rate n/k binary convolutional code;

means for buffering the encoded second information stream to provide two encoded bits per QAM symbol;

means for buffering the first information stream to provide (N−2) uncoded bits per QAM symbol; and means responsive to said buffered first and second information streams for providing successive QAM symbols, each QAM symbol consisting of orthogonal in-phase (I) and quadrature-phase (Q) components derived from two of the buffered encoded bits and (N−2) of the buffered uncoded bits, said two buffered encoded bits designating one of four symbol groups provided in said QAM constellation for partial identification of said QAM symbols.

2. The apparatus in accordance with claim 1 wherein said means for providing successive QAM symbols comprises a symbol map that is addressed by successive N bit addresses comprising (N−2) uncoded bits from said buffered first information stream and two encoded bits from said buffered second information stream, wherein said symbol map outputs said symbols in response to the successive addresses.

3. A decoder apparatus for use in decoding successive QAM symbols transmitted via a communication channel by the apparatus of claim 1 comprising:

means for receiving said transmitted QAM symbols from said communication channel corrupted by noise introduced by the channel;

means for digitizing the received symbols to provide digital data representative of said I and Q components for processing in first and second receiver paths;

said first receiver path including means for delaying said digital data;

said second receiver path including:
means for converting the digitized I and Q components into branch metrics, and
means for convolutionally decoding said branch metrics at said punctured rate n/k to recover said second information stream;

means for convolutionally reencoding said recovered second information stream at said punctured rate n/k to provide a stream of successive two bit symbol group identifiers representing best estimates of the symbol groups used to partially identify the transmitted QAM symbols;

means for buffering the stream of successive two bit symbol group identifiers for synchronization with the delayed digital data in the first receiver path;

means responsive to the stream of successive two bit symbol group identifiers for slicing successive (N−2) uncoded bit portions of delayed data from the first receiver path; and means for multiplexing the sliced (N−2) uncoded bit portions with the second information stream recovered in said second receiver path to reconstruct said original information data stream.

4. The apparatus in accordance with claim 3 wherein said branch metrics comprise components that represent the probability that the I component of a received QAM symbol designates a transmitted I=0 or I=1 group of symbols from said QAM constellation and the probability that the Q component of said received QAM symbol designates a transmitted Q=0 or Q=1 group of symbols from said QAM constellation, the combination of an I group and a Q group of symbols designating one of said four symbol groups provided in said QAM constellation.

5. The apparatus in accordance with claim 3 wherein said means for converting said digitized I and Q components into branch metrics comprises:

means for generating component metrics from said digitized I and Q components;

means for inserting erasures into the component metrics; and means for grouping the component metrics with erasures into groups of two to form branch metrics of a rate ½ trellis;

wherein said means for convolutionally decoding said branch metrics comprise a rate ½ decoder punctured to rate n/k.

6. The apparatus in accordance with claim 5 wherein said branch metrics comprise components that represent the probability that the I component of a received QAM symbol designates a transmitted I=0 or I=1 group of symbols from said QAM constellation and the probability that the Q component of said received QAM symbol designates a transmitted Q=0 or Q=1 group of symbols from said QAM constellation, the combination of an I group and a Q group of symbols designating one of said four symbol groups provided in said QAM constellation.

7. Apparatus in accordance with claim 5 wherein said means for generating component metrics incorporate a transfer function having a characteristic with periodic peaks and valleys along I and Q amplitude axes of said QAM constellation, said peaks and the center of said valleys residing at symbol group amplitude levels along said axes.

8. The apparatus in accordance with claim 3 wherein:
said means for providing successive QAM symbols comprises a symbol map that is addressed by successive N bit addresses comprising (N−2) uncoded bits from said buffered first information stream and two encoded bits from said buffered second information stream;
said symbol map outputs said symbols in response to the successive addresses; and
said second information stream is differentially encoded and said symbol map comprises a four-way two-dimensional QAM partition that is 180° rotationally invariant with respect to the uncoded bits contained in said addresses, said apparatus further comprising:
means provided in said second receiver path for differentially decoding said recovered second information stream for input to said multiplexing means.

9. The apparatus in accordance with claim 3 wherein said first receiver path delay means delay said digital data by D/(2n/k) symbols, where D is substantially the delay inherent in said second receiver path.

10. The apparatus in accordance with claim 3 wherein said means for digitizing the received symbols provides quantized digital data, and said first receiver path includes means for further quantizing said digital data.

11. A receiver for digital data communicated using trellis coded quadrature amplitude modulation (QAM) based on a $2^N$ point two dimensional QAM constellation where N is an integer greater than one, comprising:
means for digitizing received QAM symbols to provide digital data representative of orthogonal in-phase (I) and quadrature-phase (Q) components of said symbols;
a first receiver path for carrying said digital data;
a second receiver path for carrying said digital data including:
means for generating component metrics from independent I and Q components represented by said digital data,
means for grouping the component metrics with erasures into groups of two to construct branch metrics of a rate ½ trellis, and
a rate ½ convolutional decoder for decoding said constructed branch metrics to recover an information stream;
means for convolutionally reencoding said recovered information stream at a punctured rate n/k of a binary convolutional code when n/k is less than one to provide a stream of successive two bit symbol group identifiers, each identifier representing a best estimate of a symbol group of said QAM constellation that partially identifies a received QAM symbol;
means for synchronizing the stream of successive two bit symbol group identifiers and the digital data in the first receiver path;
means responsive to the synchronized stream of successive two bit symbol group identifiers for slicing successive (N−2) uncoded bit portions of data from the first receiver path; and
means for multiplexing the sliced (N−2) uncoded bit portions with the information stream recovered in said second receiver path to reconstruct a desired data stream.

12. The receiver in accordance with claim 11 wherein said component metrics represent the probability that the I component of a received QAM symbol designates a transmitted I=0 or I=1 group of symbols from said QAM constellation and the probability that the Q component of said received QAM symbol designates a transmitted Q=0 or Q=1 group of symbols from said QAM constellation, the combination of an I group and a Q group of symbols designating one of four symbol groups provided in said QAM constellation.

13. The receiver in accordance with claim 11 wherein said means for generating component metrics incorporate a transfer function having a characteristic with periodic peaks and valleys along I and Q amplitude axes of said QAM constellation, said peaks and the center of said valleys residing at symbol group amplitude levels along said axes.

14. The receiver in accordance with claim 11 wherein said first receiver path includes means for delaying said digital data by D/(2n/k) symbols, where D is substantially the delay inherent in said second receiver path.

15. The receiver in accordance with claim 11 wherein said means for digitizing the received symbols provide quantized digital data, and said first receiver path includes means for further quantizing said digital data.

16. Apparatus for processing digital data for transmission using trellis coded amplitude modulation based on $2^N$ possible amplitude levels ($2^N$ AM) provided along a one dimensional constellation where N is an integer greater than one, wherein said amplitude levels are represented by symbols transmitted at a rate of $F_S$ symbols per second, comprising:
means for splitting an original information data stream provided at a data rate of $((N−1)+n/k)F_S$ bits per second into a first "uncoded" information stream having a data rate of $(N−1)F_S$ bits per second and a second "coded" information stream having a data rate of $(n/k)F_S$ bits per second, where n/k is a punctured rate of a binary convolutional code and has a value less than one;
means for encoding said second information stream using said punctured rate n/k binary convolutional code;
means for buffering the first and second information streams to provide (N−1) uncoded bits and one encoded bit per symbol; and
means responsive to said buffered first and second information streams for providing successive symbols derived from one encoded bit and (N−1) uncoded bits, said one encoded bit designating one of two symbol groups provided in said constellation for partial identification of said symbols.

17. A receiver for digital data communicated using trellis coded amplitude modulation based on a $2^N$ point one-dimensional constellation where N is an integer greater than one, comprising:
means for digitizing received symbols to provide digital data;
a first receiver path for carrying said digital data;
a second receiver path for carrying said digital data including:
means for generating component metrics from said digital data,
means for grouping the component metrics with erasures to construct branch metrics of a rate ½ trellis, and a rate ½ convolutional decoder for decoding said constructed branch metrics to recover an information stream;

means for convolutionally reencoding said recovered information stream at a punctured rate n/k of a binary convolutional code where n/k is less than one to provide a stream of successive one bit symbol group identifiers, each identifier representing a best estimate of a symbol group of said constellation that partially identifies a received symbol;

means for synchronizing the stream of successive one bit symbol group identifiers and the digital data in the first receiver path;

means responsive to the synchronized stream of successive one bit symbol group identifiers for slicing successive (N−1) uncoded bit portions of data from the first receiver path; and means for multiplexing the sliced (N−1) uncoded bit portions with the information stream recovered in said second receiver path to reconstruct a desired data stream.

18. A method for communicating digital data using trellis coded quadrature amplitude modulation (QAM) based on a $2^N$ point two dimensional QAM constellation where N is an integer greater than one, at a symbol rate of $F_S$ QAM symbols per second, comprising the steps of:

splitting an original information data stream received at a data rate of $((N-2)+2n/k)F_s$ bits per second into a first "uncoded" information stream having a data rate of $(N-2)F_S$ bits per second and a second "coded" information stream having a data rate of $(2n/k)F_S$ bits per second, where n/k is a punctured rate of a binary convolutional code and has a value less than one;

encoding said second information stream using said punctured rate n/k binary convolutional code;

buffering the encoded second information stream to provide two encoded bits per QAM symbol;

buffering the first information stream to provide (N−2) uncoded bits per QAM symbol;

providing successive QAM symbols from the buffered first and second information streams, each QAM symbol consisting of orthogonal I and Q components derived from two of the buffered encoded bits and (N−2) of the buffered uncoded bits, said two buffered encoded bits designating one of four symbol groups provided in said QAM constellation for partial identification of said QAM symbols; and outputting the successive QAM symbols for communicating via a communication channel.

19. The method in accordance with claim 18 further comprising the steps of:

receiving said successive QAM symbols from said communication channel corrupted by noise introduced by the channel;

digitizing the received symbols to provide digital data representative of said I and Q components for processing in first and second receiver paths;

delaying said digital data in said first receiver path;

converting the digitized I and Q components in said second receiver path into branch metrics for convolutional decoding;

convolutionally decoding said branch metrics at said punctured rate n/k to recover said second information stream;

convolutionally reencoding said recovered second information stream at said punctured rate n/k to provide a stream of successive two bit symbol group identifiers representing best estimates of the symbol groups used to partially identify the transmitted QAM symbols;

buffering the stream of successive two bit symbol group identifiers for synchronization with the delayed digital data in the first receiver path;

slicing successive (N−2) uncoded bit portions from the first receiver path data in response to the stream of successive two bit symbol group identifiers; and multiplexing the sliced (N−2) uncoded bit portions with the recovered second information stream to reconstruct said original information data stream.

20. The method in accordance with claim 19 wherein said step of converting said digitized I and Q components into branch metrics comprises the steps of:

generating component metrics from said digitized I and Q components;

inserting erasures into the component metrics; and grouping the component metrics with erasures into groups of two to construct branch metrics of a rate ½ trellis;

wherein said step of convolutionally decoding said constructed branch metrics uses a rate ½ decoder.

* * * * *

UNITED STATES PATENT AND TRADEMARK OFFICE
CERTIFICATE OF CORRECTION

PATENT NO. : 5,396,518
DATED : March 7, 1995
INVENTOR(S) : How

It is certified that error appears in the above-identified patent and that said Letters Patent is hereby corrected as shown below:

Column 7, line 33:  "a  70" should be --a ◇ 70--.
Column 7, line 33:  "a  76" should be --a o 76--.
Column 10, line 26:  "groups □, ,," should be --groups □,◇,o,--.
Column 12, line 53:  "( ,X,□, )" should be --(◇,X,□,o)--.

Signed and Sealed this

Third Day of December, 1996

Attest:

BRUCE LEHMAN

Attesting Officer     Commissioner of Patents and Trademarks